(12) United States Patent
Powers et al.

(10) Patent No.: US 10,221,367 B2
(45) Date of Patent: Mar. 5, 2019

(54) LUBRICANT BASE STOCK PRODUCTION FROM DISADVANTAGED FEEDS

(71) Applicant: ExxonMobil Research and Engineering Company, Annandale, NJ (US)

(72) Inventors: Corry S. Powers, Spring, TX (US); Liezhong Gong, Basking Ridge, NJ (US); Nicole D. Vaughn, Spring, TX (US); Beatrice M. Gooding, Hopewell, NJ (US); Kendall S. Fruchey, Easton, PA (US); Eric D. Joseck, Spring, TX (US); Marc Sonnentrucker, Tancarville (FR)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 75 days.

(21) Appl. No.: 15/381,517

(22) Filed: Dec. 16, 2016

(65) Prior Publication Data

US 2017/0211003 A1 Jul. 27, 2017

Related U.S. Application Data

(60) Provisional application No. 62/271,455, filed on Dec. 28, 2015.

(51) Int. Cl.
| | |
|---|---|
| C10G 69/02 | (2006.01) |
| C10G 45/58 | (2006.01) |
| C10G 65/02 | (2006.01) |
| C10G 65/04 | (2006.01) |
| C10G 65/12 | (2006.01) |
| C10G 67/04 | (2006.01) |
| C10G 69/04 | (2006.01) |
| C10M 101/02 | (2006.01) |
| C10G 11/18 | (2006.01) |
| B01J 23/88 | (2006.01) |
| B01J 23/888 | (2006.01) |
| B01J 29/06 | (2006.01) |
| B01J 35/10 | (2006.01) |

(52) U.S. Cl.
CPC .............. *C10G 69/02* (2013.01); *B01J 23/88* (2013.01); *B01J 23/888* (2013.01); *B01J 29/06* (2013.01); *B01J 35/1019* (2013.01); *B01J 35/1061* (2013.01); *C10G 11/18* (2013.01); *C10G 45/58* (2013.01); *C10G 65/02* (2013.01); *C10G 65/04* (2013.01); *C10G 65/12* (2013.01); *C10G 67/0418* (2013.01); *C10G 67/0445* (2013.01); *C10G 69/04* (2013.01); *C10M 101/02* (2013.01); *C10G 2300/1048* (2013.01); *C10G 2300/1074* (2013.01); *C10G 2300/1077* (2013.01); *C10G 2300/1096* (2013.01); *C10G 2300/202* (2013.01); *C10G 2300/301* (2013.01); *C10G 2300/302* (2013.01); *C10G 2400/10* (2013.01); *C10M 2203/1006* (2013.01); *C10N 2220/022* (2013.01)

(58) Field of Classification Search
CPC C10G 67/0418; C10G 67/0436; C10G 69/02; C10G 2400/10
See application file for complete search history.

(56) References Cited

U.S. PATENT DOCUMENTS

| | | | | |
|---|---|---|---|---|
| 3,929,617 | A * | 12/1975 | Henry | C10G 47/12 208/18 |
| 4,213,845 | A | 7/1980 | Masada | |
| 4,622,129 | A | 11/1986 | Bayle | |
| 4,853,104 | A * | 8/1989 | Degnan, Jr. | C10G 69/04 208/18 |
| 5,122,257 | A * | 6/1992 | Van Helden | C10G 65/12 208/49 |
| 5,833,837 | A * | 11/1998 | Miller | C10G 65/16 208/80 |
| 6,569,313 | B1 * | 5/2003 | Carroll | C10G 65/12 208/108 |
| 2015/0014216 | A1 | 1/2015 | Sundararaman et al. | |
| 2015/0361351 | A1 | 12/2015 | Banerjee et al. | |

FOREIGN PATENT DOCUMENTS

| | | |
|---|---|---|
| WO | WO02059234 A1 | 8/2002 |

OTHER PUBLICATIONS

The International Search Report and Written Opinion of PCT/US2016/067173 dated Mar. 13, 2017.

* cited by examiner

*Primary Examiner* — Randy Boyer
(74) *Attorney, Agent, or Firm* — Scott F. Yarnell (57) ABSTRACT

Methods are provided for upgrading disadvantaged feeds for use in lubricant base stock production. A disadvantaged feed can be upgraded by hydroprocessing the feed to form a hydroprocessed bottoms fraction. The hydroprocessed bottoms fraction can then be used as a feed for forming Group I and/or Group II lubricant base stocks, optionally in combination with a conventional feed for lubricant production. The remaining portions of the hydroprocessing effluent can optionally be used for FCC processing and/or for other conventional applications of naphtha and distillate fractions.

16 Claims, 5 Drawing Sheets

| | | Extracts | HDP Effluent | HCO | HDP HCO | Topped Crude Oil | HDP Effluent |
|---|---|---|---|---|---|---|---|
| Bottoms Yield, wt% | | | 95.7 | | 53.5 | | 67.0 |
| API | | 16.9 | 20.7 | 4.8 | 14.8 | 23.8 | 20.8 |
| SG | | 0.954 | 0.930 | 1.038 | 0.967 | 0.911 | 0.929 |
| Sulfur | wt% | 2.1 | 0.7 | 0.4 | 0.1 | 0.4 | 0.1 |
| Total Nitrogen | ppm | 1492.8 | 1270.8 | 1104.3 | 611.5 | 1304.7 | 1695.2 |
| Basic Nitrogen | ppm | 746.6 | 642.4 | 125.4 | 21.7 | 579.6 | 692.1 |
| CCR | wt% | 0.0 | 0.0 | 0.0 | 0.0 | 0.1 | 0.1 |
| Nickel | ppm | 0.0 | 0.0 | 0.0 | 0.0 | 0.4 | 0.3 |
| Vanadium | ppm | 0.0 | 0.0 | 0.0 | 0.0 | 5.2 | 3.3 |
| Distillation | | | | | | | |
| IBP | deg C | 301.8 | 387.9 | 244.3 | 357.1 | 160.0 | 380.6 |
| 5% | deg C | 382.0 | 396.3 | 271.9 | 361.3 | 242.8 | 390.1 |
| 50% | deg C | 443.0 | 437.7 | 379.8 | 389.6 | 398.0 | 479.5 |
| 90% | deg C | 512.9 | 512.6 | 422.9 | 427.7 | 562.0 | 574.4 |
| 95% | deg C | 527.0 | 520.4 | 432.8 | 439.3 | 584.1 | 617.8 |
| FBP | deg C | 541.9 | 535.5 | 463.2 | 459.6 | 628.4 | 627.6 |
| | | | | | | | |
| Paraffins | | 18.4 | 19.8 | 6.0 | 14.4 | 13.9 | 8.9 |
| Olefins | | 0.0 | 0.0 | 0.4 | 0.0 | 0.0 | 0.0 |
| Napthenes | | 20.1 | 24.0 | 3.7 | 10.0 | 43.0 | 40.4 |
| Aromatics | | 61.5 | 56.2 | 89.8 | 75.6 | 43.0 | 50.7 |

FIG. 3

| 150N base oils | Run Type 1 (avg) | Run Type 1 (end of run) | Run Type 2 (avg) |
|---|---|---|---|
| KV @ 40°C (cSt) | 28.6 | 29.9 | 30.9 |
| KV @ 100°C (cSt) | 5.1 | 5.1 | 5.2 |
| Viscosity Index | 104 | 103 | 99 |
| Pour Point (°C) | -12 | -13 | -13 |
| Sulfur (wt%) | 0.49 | 0.56 | 0.58 |
| Aliphatic Sulfur (wt%) | 0.28 | 0.31 | 0.35 |
| Basic Nitrogen (wppm) | 16 | 27 | 32 |
| Total aromatics (wt%) | ~23 | ~24 | ~25 |
| 2+ ring aromatics (wt%) | ~5 | ~6 | ~6 |
| 3+ ring aromatics (wt%) | ~1 | ~1 | ~1 |
| Noack volatility (wt%) | 14.3 | 15.4 | 14.2 |
| Saturates (wt%) | 73 | 72 | 70 |

FIG. 4

| 600N base oils | Run Type 1 (avg) | Run Type 2 (avg) |
|---|---|---|
| KV @ 40°C (cSt) | 113.9 | 102.7 |
| KV @ 100°C (cSt) | 12.2 | 11.4 |
| Viscosity Index | 97 | 96 |
| Pour Point (°C) | -8 | -6 |
| Sulfur (wt%) | 0.81 | 0.74 |
| Aliphatic Sulfur (wt%) | 0.38 | 0.42 |
| Basic Nitrogen (wppm) | 59 | 66 |
| Total aromatics (wt%) | ~23 | ~22 |
| 2+ ring aromatics (wt%) | ~8 | ~7 |
| 3+ ring aromatics (wt%) | ~2 | ~2 |
| DSC wax (-5°C) (wt%) | 1.41 | 1.87 |
| Saturates (wt%) | 67 | 68 |

FIG. 5

LUBRICANT BASE STOCK PRODUCTION FROM DISADVANTAGED FEEDS

CROSS-REFERENCE TO RELATED APPLICATIONS

This application claims priority to U.S. Provisional Application Ser. No. 62/271,455 filed Dec. 28, 2015, which is herein incorporated by reference in its entirety.

FIELD

Systems and methods are provided for processing of non-traditional feeds as part of lubricant base stock production.

BACKGROUND

Fluid catalytic cracking (FCC) processes are commonly used in refineries as a method for converting feedstocks to produce lower boiling fractions suitable for use as fuels. This can allow a variety of heavier feedstocks that are not directly suitable for lubricant base stock production to be converted into fuel boiling range fractions. Although FCC processes do not require hydrogen, a preliminary hydrotreatment step is often performed prior to FCC processing in order to improve the yield and/or product quality from an FCC process.

U.S. Pat. No. 3,929,617 describes a method to make a high quality UV stable lubricating oil stocks by hydrocracking a hydrocarbon feedstock under mild hydrocracking conditions to increase the viscosity index of the feedstock. The hydrocrackate product is subsequently solvent-extracted with a solvent having preferential solubility for aromatics, thereby forming extract and raffinate phases. The extract phase is stripped of solvent, and at least a portion of the substantially solvent-free extract phase is recycled to the hydrocracking step.

U.S. Pat. No. 4,213,845 taught a process to make lube oil stock with superior sunlight stability by blending 100 parts of raffinate with 10-45 parts of a raw hydrocrackate stock.

SUMMARY

In an aspect, a method for forming a lubricant base stock is provided. The method includes hydroprocessing a feed having at least one of a) a total aromatics content of at least 60 wt % and b) a paraffin content of 10 wt % or less under first effective hydroprocessing conditions to form a hydroprocessed effluent. A bottoms fraction of the hydroprocessed effluent can correspond to at least 50 wt % of hydroprocessed effluent. The hydroprocessed bottoms can have a paraffin content of at least 10 wt % (or at least 15 wt %), a total aromatics content of 60 wt % or less (or 50 wt % or less), or a combination thereof. A solvent extraction can be performed on at least a portion of the hydroprocessed bottoms to form an extract fraction and a raffinate fraction. At least a portion of the raffinate fraction can be hydroprocessed under second effective hydroprocessing conditions to form a hydroprocessed raffinate. At least a portion of the hydroprocessed raffinate can be catalytically dewaxed to form a catalytic dewaxing effluent. The catalytic dewaxing effluent can have a VI of at least 80, an aromatics content of 10 wt % or less, and a sulfur content of 300 wppm or less.

In another aspect, a lubricant base stock composition having a viscosity index of at least 80, an aromatics content of 10 wt % or less, and a sulfur content of 300 wppm is provided. The lubricant base stock composition can be formed by a method that includes hydroprocessing a feed having at least one of a) a total aromatics content of at least 60 wt % and b) a paraffin content of 10 wt % or less under first effective hydroprocessing conditions to form a hydroprocessed effluent. A bottoms fraction of the hydroprocessed effluent can correspond to at least 50 wt % of hydroprocessed effluent. The hydroprocessed bottoms can have a paraffin content of at least 10 wt % (or at least 15 wt %), a total aromatics content of 60 wt % or less (or 50 wt % or less), or a combination thereof. A solvent extraction can be performed on at least a portion of the hydroprocessed bottoms to form an extract fraction and a raffinate fraction. At least a portion of the raffinate fraction can be hydroprocessed under second effective hydroprocessing conditions to form a hydroprocessed raffinate. At least a portion of the hydroprocessed raffinate can be catalytically dewaxed to form a catalytic dewaxing effluent. The catalytic dewaxing effluent can have a VI of at least 80, an aromatics content of 10 wt % or less, and a sulfur content of 300 wppm or less.

DETAILED DESCRIPTION

All numerical values within the detailed description and the claims herein are modified by "about" or "approximately" the indicated value, and take into account experimental error and variations that would be expected by a person having ordinary skill in the art.

In various aspects, systems and methods are provided for upgrading disadvantaged feeds for use in lubricant base stock production. A disadvantaged feed can be upgraded by hydroprocessing the feed to form a hydroprocessed bottoms fraction corresponding to at least 40 wt % or at least 50 wt % of the feed. The hydroprocessed bottoms fraction (or at least a portion thereof) can then be used as a feed for forming Group I and/or Group II lubricant base stocks, optionally in combination with a conventional feed for lubricant production. The remaining portions of the hydroprocessing effluent can optionally be used for FCC processing and/or for other conventional applications of naphtha and distillate fractions.

When a feed for a fluid catalytic cracking process (FCC) is pre-hydroprocessed (such as pre-hydrotreated) prior to FCC processing, the bottoms fraction from the pre-hydroprocessed is typically used as a fuels feed. It has been determined that the bottoms fraction from such pre-hydroprocessing can instead be used as at least part of a feedstock for lubricant base stock production if the input feed to the pre-hydroprocessing process is within a defined quality envelope. This can correspond to a substantial improvement in the overall value of the bottoms fraction. In some instances, substantially all of the effluent from hydroprocessing can be used for lubricant base stock production, so that little or no effluent is subsequently used for FCC processing.

In some aspects, the hydroprocessed bottoms from the disadvantaged feed can be further processed to form lubricant base stock(s). In other aspects, the hydroprocessed bottoms can be combined with a conventional feed for further processing to form lubricant base stock(s).

As an example of further processing to form lubricant base stock(s), the hydroprocessed bottoms (or a combination of hydroprocessed bottoms and conventional feed) can be solvent extracted. At least a portion of the raffinate from solvent extraction can then be solvent dewaxed to form Group I lubricant base stock(s). Additionally or alternately, at least a portion of the raffinate can be catalytically processed to form Group I and/or Group II lubricant base stocks. For example, the raffinate can be exposed to hydroconversion conditions (hydrotreating and/or hydrocracking), catalytic dewaxing conditions, and optionally hydrofinishing conditions to form lubricant base stock(s).

In some aspects, reference is made to conversion of a feedstock relative to a conversion temperature T. Conversion relative to a temperature T is defined based on the portion of the feedstock that boils at a temperature greater than the conversion temperature T. The amount of conversion during a process (or optionally across multiple processes) is defined as the weight percentage of the feedstock that is converted from boiling at a temperature above the conversion temperature T to boiling at a temperature below the conversion temperature T. As an illustrative hypothetical example, consider a feedstock that includes 40 wt % of components that boil at 371° C. (700° F.) or greater. By definition, the remaining 60 wt % of the feedstock boils at less than 371° C. (700° F.). For such a feedstock, the amount of conversion relative to a conversion temperature of 371° C. (700° F.) would be based only on the 40 wt % that initially boils at 371° C. (700° F.) or greater.

In this discussion, unless otherwise specified a lubricant boiling range fraction corresponds to a fraction having a boiling range from 343° C. (650° F.) to 566° C. (1050° F.). Thus, lubricant boiling range fractions can have initial boiling points (or alternatively T5 boiling points or T10 boiling points) of at least 193° C. and final boiling points (or alternatively T95 boiling points or T90 boiling points) of 343° C. or less. A diesel boiling range fraction corresponds to a fraction having a boiling range from 193° C. (375° F.) to 343° C. (650° F.). Thus, diesel boiling range fractions can have initial boiling points (or alternatively T5 boiling points or T10 boiling points) of at least 193° C. and final boiling points (or alternatively T95 boiling points or T90 boiling points) of 343° C. or less. A naphtha boiling range fraction corresponds to a fraction having a boiling range from 36° C. (122° F.) to 193° C. (375° F.). Thus, naphtha fuel product fractions can have initial boiling points (or alternatively T5 boiling points or T10 boiling points) of at least 36° C. and final boiling points (or alternatively T95 boiling points or T90 boiling points) of 193° C. or less. It is noted that 36° C. roughly corresponds to a boiling point for the various isomers of a C5 alkane. Light ends are defined as products with boiling points below 36° C., which include various C1-C4 compounds. When determining a boiling point or a boiling range for a feed or product fraction, an appropriate ASTM test method can be used, such as the procedures described in ASTM D2887, D2892, or D86. A "Txx" boiling point refers to the distillation temperature at which "xx" wt % of a sample will boil off, as determined by a suitable ASTM method.

Group I basestocks or base oils are defined as base stocks with less than 90 wt % saturated molecules and/or at least 0.03 wt % sulfur content. Group I base stocks also have a viscosity index (VI) of at least 80 but less than 120. Group II basestocks or base oils contain at least 90 wt % saturated molecules and less than 0.03 wt % sulfur. Group II bases oils also have a viscosity index of at least 80 but less than 120. Group III basestocks or base oils contain at least 90 wt % saturated molecules and less than 0.03 wt % sulfur, with a viscosity index of at least 120. In addition to the above formal definitions, some Group I basestocks (or base oils) may be referred to as a Group I+ basestock (or base oil), which corresponds to a Group I basestock with a VI value of 103 to 108. Some Group II basestocks (or base oils) may be referred to as a Group II+ basestock (or base oil), which corresponds to a Group II basestock with a VI of at least 113. Some Group III basestocks (base oils) may be referred to as a Group III+ basestock (or base oil), which corresponds to a Group III basestock with a VI value of at least 140.

Disadvantaged Feedstocks

Examples of disadvantaged feeds can include, but are not limited to, lube extracts from solvent extraction of feedstocks for lubricant base stock production; heavy cycle oils from an FCC process and/or other heavy cracked gas oils; and vacuum gas oils and/or vacuum resid fractions with paraffin contents lower than would typically be suitable for lubricant base stock production and/or aromatics contents greater than would typically be suitable for lubricant base stock production.

The boiling range of a disadvantaged feed can be any convenient boiling range that has at least some overlap with the lubricant boiling range. Depending on the aspect, a disadvantaged feed can have a boiling range based on a T5 or T10 boiling point to a T95 or T90 boiling point of 150° C. to 650° C., or 200° C. to 650° C., or 250° C. to 650° C., or 300° C. to 650° C., or 350° C. to 650° C., or 400° C. to 650° C., or 150° C. to 600° C., or 200° C. to 600° C., or 250° C. to 600° C., or 300° C. to 600° C., or 350° C. to 600° C., or 400° C. to 600° C., or 150° C. to 550° C., or 200° C. to 550° C., or 250° C. to 550° C., or 300° C. to 550° C., or 350° C. to 550° C., or 400° C. to 550° C.

Prior to hydroprocessing (such as hydrotreatment), a disadvantaged feed can have one or more of the following characteristics, such as a plurality of the following characteristics: a) a total aromatics of at least 60 wt % or at least 70 wt %, such as up to 95 wt %; b) a paraffin content of 10 wt % or less, or 8 wt % or less; c) a sulfur content of 3000 wppm to 30,000 wppm, or 3000 wppm to 20,000 wppm; or 4000 wppm to 30,000 wppm, or 4000 wppm to 20,000 wppm; and/or d) a basic nitrogen content of at least 500 wppm, or at least 600 wppm, such as up to 1500 wppm or more.

After hydroprocessing, a hydroprocessed bottoms fraction derived from a disadvantaged feed can have one or more of the following characteristics, such as a plurality of the following characteristics: a) an aromatics content of 1 wt % to 70 wt %, or 1 wt % to 60 wt %, or 5 wt % to 70 wt %, or 5 wt % to 60 wt %, or 15 wt % to 70 wt %, or 15 wt % to 60 wt %, or 25 wt % to 70 wt %, or 25 wt % to 60 wt %; b) a 2-ring aromatic content of 1 wt % to 40 wt %, or 1 wt % to 30 wt %, or 5 wt % to 40 wt %, or 5 wt % to 30 wt %, or 10 wt % to 40 wt %, or 10 wt % to 30 wt %, or 15 wt % to 40 wt %, or 15 wt % to 30 wt %; c) a 3-ring aromatic content of 1 wt % to 20 wt %, or 1 wt % to 15 wt %, or 3 wt % to 20 wt %, or 3 wt % to 15 wt %, or 5 wt % to 20 wt %, or 5 wt % to 15 wt %; d) a sulfur content of 3000 wppm or less, or 2000 wppm or less; e) a basic nitrogen content of 500 wppm or less, or 200 wppm or less; f) a viscosity index of at least 50, or at least 60, or at least 70, and/or g) a solvent dewaxed viscosity index at a pour point of −9° C. (sometimes referred to a distillate dewaxed viscosity index) of at least 40, or at least 50, or at least 60.

After hydroprocessing, the hydroprocessed bottoms can correspond to a substantial portion of the total hydroprocessed effluent. The hydroprocessed bottoms can be defined as a 350° C.+ portion of the hydroprocessed effluent. For example, the yield of hydroprocessed bottoms relative to the disadvantaged feed can be 40 wt % to 99 wt % of the feed, or 50 wt % to 99 wt %, or 60 wt % to 99 wt %.

In some aspects, the hydroprocessed bottoms can be processed as a feed for lubricant base stock production. In other aspects, the hydroprocessed bottoms can be blended with a conventional feed for lubricant base stock production. The hydroprocessed bottoms can be blended with conventional feed for lubricant base stock production in any convenient ratio, such as a ratio of hydroprocessed bottoms to conventional feed of 0.01 (i.e. ~1 wt % hydroprocessed bottoms) to 1 (i.e., ~50 wt % hydroprocessed bottoms), or 0.02 to 1, or 0.05 to 1, or 0.1 to 1, or 0.2 to 1, or 0.3 to 1, 0.01 to 0.5, or 0.02 to 0.5, or 0.05 to 0.5, or 0.1 to 0.5, or 0.2 to 0.5, or 0.3 to 0.5, 0.01 to 0.2, or 0.02 to 0.2, or 0.05 to 0.2, or 0.1 to 0.2, or 0.01 to 0.1, or 0.0.2 to 0.1. Optionally, in various aspects, the hydroprocessed bottoms and/or hydroprocessed bottoms blended with a conventional feed can be fractionated prior to further processing. Such a fractionation can result in formation of at least a lubricant boiling range fraction from the hydroprocessed bottoms and/or hydroprocessed bottoms blended with conventional feed, and optionally can result in formation of one or more lower boiling fractions and/or a resid fraction. In other optional aspects, a conventional feed can be fractionated separately to form a lubricant boiling range fraction, so that the hydroprocessed bottoms are blended with a lubricant boiling range fraction derived from a conventional feed for lubricant base stock production.

Hydroprocessing Conditions

In various aspects, a disadvantaged feed can be hydroprocessed under effective hydrotreating conditions to form a hydrotreated effluent. Optionally, the effective hydrotreating conditions can be selected to allow for reduction of the sulfur content of the hydrotreated bottoms to less than 4000 wppm, or less than 3000 wppm, or less than 2000 wppm. Additionally or alternatively, the effective hydrotreating conditions can be selected to allow for reduction of the basic nitrogen content of the hydrotreated effluent to less than 500 wppm, or less than 200 wppm. Additionally or alternatively, the effective hydrotreating conditions can be selected to allow for reduction of aromatics content to 70 wt % or less, or 60 wt % or less, or 50 wt % or less.

Hydroprocessing (such as hydrotreating) is carried out in the presence of hydrogen. A hydrogen stream can be fed or injected into a vessel or reaction zone or hydroprocessing zone in which the hydroprocessing catalyst is located. Hydrogen, which is contained in a hydrogen "treat gas," is provided to the reaction zone. Treat gas, as referred to herein, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and would typically be removed from the treat gas before it is conducted to the reactor. In aspects where the treat gas stream is different from a stream that substantially consists of hydrogen (i.e., at least 99 vol % hydrogen), the treat gas stream introduced into a reaction stage can contain at least 50 vol %, or at least 75 vol % hydrogen, or at least 90 vol % hydrogen.

During hydrotreatment, a feedstream can be contacted with a hydrotreating catalyst under effective hydrotreating conditions which include temperatures in the range of 232° C. to 399° C. (450° F. to 750° F.), or 288° C. to 371° C. (550° F. to 700° F.); pressures in the range of 1.5 MPa to 20.8 MPa (200 to 3000 psig), or 2.9 MPa to 13.9 MPa (400 to 2000 psig); a liquid hourly space velocity (LHSV) of from 0.1 to 10 $hr^{-1}$, or 0.1 to 5 $hr^{-1}$; and a hydrogen treat gas rate of from 450 to 2670 $m^3/m^3$ (2500 to 15000 scf/B), or 890 to 1780 $m^3/m^3$ (5000 to 10000 scf/B).

In an aspect, the hydrotreating step may comprise at least one hydrotreating reactor, and optionally may comprise two or more hydrotreating reactors arranged in series flow. A vapor separation drum can optionally be included after each hydrotreating reactor to remove vapor phase products from the reactor effluent(s). The vapor phase products can include hydrogen, $H_2S$, $NH_3$, and hydrocarbons containing four (4) or less carbon atoms (i.e., "C4-hydrocarbons"). The effective hydrotreating conditions can be suitable for removal of at least 70 wt %, or at least 80 wt %, or at least 90 wt % of the sulfur content in the feedstream from the resulting liquid products. Additionally or alternately, at least 50 wt %, or at least 75 wt % of the nitrogen content in the feedstream can be removed from the resulting liquid products.

Hydrotreating catalysts suitable for use herein can include those containing at least one Group VIA metal and at least one Group VIII metal, including mixtures thereof. Examples of suitable metals include Ni, W, Mo, Co and mixtures thereof, for example CoMo, NiMoW, NiMo, or NiW. These metals or mixtures of metals are typically present as oxides or sulfides on refractory metal oxide supports. The amount of metals for supported hydrotreating catalysts, either individually or in mixtures, can range from 0.5 to 35 wt %, based on the weight of the catalyst. Additionally or alternatively, for mixtures of Group VIA and Group VIII metals, the Group VIII metals are present in amounts of from 0.5 to 5 wt % based on catalyst, and the Group VIA metals are present in amounts of from 5 to 30 wt % based on the catalyst. A mixture of metals may also be present as a bulk metal catalyst wherein the amount of metal is 30 wt % or greater, based on catalyst weight.

Suitable metal oxide supports for the hydrotreating catalysts include oxides such as silica, alumina, silica-alumina, titania, or zirconia. Examples of aluminas suitable for use as a support can include porous aluminas such as gamma or eta. In some aspects, when a porous metal oxide support is utilized, the catalyst can have an average pore size (as measured by nitrogen adsorption) of 30 Å to 1000 Å, or 50 Å to 500 Å, or 60 Å to 300 Å. Pore diameter can be determined, for example, according to ASTM Method D4284-07 Mercury Porosimetry. Additionally or alternatively, the catalyst can have a surface area (as measured by the BET method) of 100 to 350 $m^2/g$, or 150 to 250 $m^2/g$. In some aspects, a supported hydrotreating catalyst can have the form of shaped extrudates. The extrudate diameters can range from $\frac{1}{32}^{nd}$ to $\frac{1}{8}^{th}$ inch, from $\frac{1}{20}^{th}$ to $\frac{1}{10}^{th}$ inch, or from $\frac{1}{20}^{th}$ to $\frac{1}{16}^{th}$ inch. The extrudates can be cylindrical or shaped. Non-limiting examples of extrudate shapes include trilobes and quadralobes.

In addition to hydrotreatment or as an alternative to hydrotreatment, a disadvantaged feed can be hydroprocessed by exposing the disadvantaged feed to effective hydrocracking conditions, as are described in greater detail below.

Conventional Feedstocks

In aspects where the hydroprocessed (such as hydrotreated) bottoms from a disadvantaged feed is blended with a conventional lubricant base stock feedstock, a wide range of petroleum and chemical feedstocks can be suitable as the conventional feedstock. In some aspects, a conventional feedstock can correspond to a whole petroleum crude oil, a reduced petroleum crude oil, a virgin distillate, a virgin vacuum gas oil, or a combination thereof. In other aspects, suitable conventional feedstocks can include whole and reduced petroleum crudes, atmospheric and vacuum residua, propane deasphalted residua, e.g., brightstock, cycle oils, FCC tower bottoms, gas oils, including vacuum gas oils and coker gas oils, light to heavy distillates including raw virgin distillates, hydrocrackates, hydrotreated oils, slack waxes, Fischer-Tropsch waxes, raffinates, and mixtures of these materials.

Typical feeds include, for example, feeds with an initial boiling point of at least 343° C., or at least 370° C., or at least 399° C. Alternatively, a feed may be characterized using a T5 boiling point, such as a feed with a T5 boiling point of at least 343° C., or at least 370° C., or at least 399° C. In some aspects, the final boiling point of the feed can be at least 593° C., such as at least 621° C. or at least 649° C. In other aspects, a feed may be used that does not include a large portion of molecules that would traditional be considered as vacuum distillation bottoms. For example, the feed may correspond to a vacuum gas oil feed that has already been separated from a traditional vacuum bottoms portion. Such feeds include, for example, feeds with a final boiling point of 621° C., or 593° C. or less, or 566° C. or less. Alternatively, a feed may be characterized using a T95 boiling point, such as a feed with a T95 boiling point of 621° C. or less, or 593° C. or less, or 566° C. or less. An example of a suitable type of feedstock is a wide cut vacuum gas oil (VGO) feed, with a T5 boiling point of at least 370° C. (700° F.) and a T95 boiling point of 593° C. (1100° F.) or less. Optionally, the initial boiling point of such a wide cut VGO feed can be at least 370° C. and/or the final boiling point can be at least 593° C.

In embodiments involving a sulfur removal stage prior to hydrocracking, the sulfur content of the feed can be at least 300 ppm by weight of sulfur, or at least 1000 wppm, or at least 2000 wppm, or at least 4000 wppm, or at least 10,000 wppm, or at least 20,000 wppm. In other embodiments, including some embodiments where a previously hydrotreated and/or hydrocracked feed is used, the sulfur content can be 2000 wppm or less, or 1000 wppm or less, or 500 wppm or less, or 100 wppm or less.

Solvent Extraction

Solvent extraction can be used to reduce the aromatics content and/or the amount of polar molecules. The solvent extraction process selectively dissolves aromatic components to form an aromatics-rich extract phase while leaving the more paraffinic components in an aromatics-poor raffinate phase. Naphthenes are distributed between the extract and raffinate phases. Typical solvents for solvent extraction include phenol, furfural and N-methyl pyrrolidone. By controlling the solvent to oil ratio, extraction temperature and method of contacting distillate to be extracted with solvent, one can control the degree of separation between the extract and raffinate phases. Any convenient type of liquid-liquid extractor can be used, such as a counter-current liquid-liquid extractor. Depending on the initial concentration of aromatics in the deasphalted oil, the raffinate phase can have an aromatics content of 5 wt % to 25 wt %. For typical feeds, the aromatics content of the raffinate phase will be at least 10 wt %.

Optionally, the raffinate from the solvent extraction can be under-extracted. In such aspects, the extraction is carried out under conditions such that the raffinate yield is maximized while still removing most of the lowest quality molecules from the feed. Raffinate yield may be maximized by controlling extraction conditions, for example, by lowering the solvent to oil treat ratio and/or decreasing the extraction temperature. In various aspects, the raffinate yield from solvent extraction can be at least 40 wt %, or at least 50 wt %, or at least 60 wt %, or at least 70 wt %.

Solvent Dewaxing to Form Group I Bright Stock

In some aspects, at least a portion of the raffinate from solvent extraction can then be solvent dewaxed to produce a lubricant base stock product. Solvent dewaxing typically involves mixing a feed with chilled dewaxing solvent to form an oil-solvent solution. Precipitated wax is thereafter separated by, for example, filtration. The temperature and solvent are selected so that the oil is dissolved by the chilled solvent while the wax is precipitated.

An example of a suitable solvent dewaxing process involves the use of a cooling tower where solvent is pre-chilled and added incrementally at several points along the height of the cooling tower. The oil-solvent mixture is agitated during the chilling step to permit substantially instantaneous mixing of the prechilled solvent with the oil. The prechilled solvent is added incrementally along the length of the cooling tower so as to maintain an average chilling rate at or below 10° F. per minute, usually between 1 to 5° F. per minute. The final temperature of the oil-solvent/precipitated wax mixture in the cooling tower will usually be between −17.8° C. and 10° C. (0° F. and 50° F.). The mixture may then be sent to a scraped surface chiller to separate precipitated wax from the mixture.

Representative dewaxing solvents are aliphatic ketones having 3-6 carbon atoms such as methyl ethyl ketone and methyl isobutyl ketone, low molecular weight hydrocarbons such as propane and butane, and mixtures thereof. The solvents may be mixed with other solvents such as benzene, toluene or xylene.

In general, the amount of solvent added will be sufficient to provide a liquid/solid weight ratio between the range of 5/1 and 20/1 at the dewaxing temperature and a solvent/oil volume ratio between 1.5/1 to 5/1. In various aspects, the solvent dewaxed oil can be dewaxed to a pour point of −6° C. or less, or −9° C. or less, or −15° C. or less, depending on the nature of the target lubricant base stock product. The resulting solvent dewaxed oil can be suitable for use in forming one or more types of Group I base stocks. Optionally, the resulting solvent dewaxed oil can have a viscosity index of at least 90, or at least 95, or at least 100.

Raffinate Hydroconversion (Hydrotreating and Hydrocracking)

In some aspects, at least a portion of the raffinate from solvent extraction can undergo further catalytic processing to form lubricant base stocks. This can include hydrotreatment and/or hydrocracking to remove heteroatoms to desired levels and/or to provide viscosity index (VI) uplift. Depending on the aspect, a raffinate from solvent extraction can be hydroprocessed by hydrotreating, hydrocracking, or hydrotreating and hydrocracking.

The reaction conditions during hydrotreatment and/or hydrocracking of the raffinate from solvent extraction can be selected to generate a desired level of conversion of a feed.

Conversion of the feed can be defined in terms of conversion of molecules that boil above a temperature threshold to molecules below that threshold. The conversion temperature can be any convenient temperature, such as 370° C. (700° F.). The amount of conversion can correspond to the total conversion of molecules within the combined hydrotreatment and hydrocracking stages for the raffinate. Suitable amounts of conversion of molecules boiling above 370° C. (700° F.) to molecules boiling below 370° C. include 10 wt % to 70 wt % conversion relative to 370° C., or 10 wt % to 60 wt %, or 10 wt % to 50 wt %, or 20 wt % to 70 wt %, or 20 wt % to 60 wt %, or 20 wt % to 50 wt %, or 30 wt % to 70 wt %, or 30 wt % to 60 wt %, or 30 wt % to 50 wt %.

The hydroprocessed raffinate can also be characterized based on the product quality. After hydroprocessing (hydrotreating and/or hydrocracking), the hydroprocessed raffinate can have a sulfur content of 200 wppm or less, or 100 wppm or less, or 50 wppm or less. Additionally or alternately, the hydroprocessed raffinate can have a nitrogen content of 200 wppm or less, or 100 wppm or less, or 50 wppm or less. Additionally or alternately, the hydroprocessed raffinate can have an aromatics content of 15 wt % or less, or 10 wt % or less, or 8 wt % or less.

In various aspects, the raffinate from solvent extraction (or at least a portion thereof) can be exposed to a hydrotreating catalyst under effective hydrotreating conditions. The catalysts used can include conventional hydroprocessing catalysts, such as those comprising at least one Group VIII non-noble metal (Columns 8-10 of IUPAC periodic table), preferably Fe, Co, and/or Ni, such as Co and/or Ni; and at least one Group VI metal (Column 6 of IUPAC periodic table), preferably Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å; a surface area from 100 to 300 m$^2$/g, or 150 to 250 m$^2$/g; and a pore volume of from 0.25 to 1.0 cm$^3$/g, or 0.35 to 0.8 cm$^3$/g. More generally, any convenient size, shape, and/or pore size distribution for a catalyst suitable for hydrotreatment of a distillate (including lubricant base stock) boiling range feed in a conventional manner may be used. Preferably, the support or carrier material is an amorphous support, such as a refractory oxide. Preferably, the support or carrier material can be free or substantially free of the presence of molecular sieve, where substantially free of molecular sieve is defined as having a content of molecular sieve of less than 0.01 wt %.

The Group VIII non-noble metal(s), in oxide form, can typically be present in an amount ranging from 2 wt % to 40 wt %, preferably from 4 wt % to 15 wt %. The Group VI metal(s), in oxide form, can typically be present in an amount ranging from 2 wt % to 70 wt %, preferably for supported catalysts from 6 wt % to 40 wt % or from 10 wt % to 30 wt %. These weight percents are based on the total weight of the catalyst. Suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to in this disclosure, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane). The treat gas stream introduced into a reaction stage will preferably contain at least 50 vol. % and more preferably at least 75 vol. % hydrogen. Optionally, the hydrogen treat gas can be substantially free (less than 1 vol %) of impurities such as $H_2S$ and $NH_3$ and/or such impurities can be substantially removed from a treat gas prior to use.

Hydrogen can be supplied at a rate of from 100 SCF/B (standard cubic feet of hydrogen per barrel of feed) (17 Nm$^3$/m$^3$) to 10000 SCF/B (1700 Nm$^3$/m$^3$). Preferably, the hydrogen is provided in a range of from 200 SCF/B (34 Nm$^3$/m$^3$) to 2500 SCF/B (420 Nm$^3$/m$^3$). Hydrogen can be supplied co-currently with the input feed to the hydrotreatment reactor and/or reaction zone or separately via a separate gas conduit to the hydrotreatment zone.

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.8 MPag); liquid hourly space velocities (LHSV) of 0.1 hr$^{-1}$ to 10 hr$^{-1}$; and hydrogen treat rates of 200 scf/B (35.6 m$^3$/m$^3$) to 10,000 scf/B (1781 m$^3$/m$^3$), or 500 (89 m$^3$/m$^3$) to 10,000 scf/B (1781 m$^3$/m$^3$).

In various aspects, the raffinate from solvent extraction (or at least a portion thereof) can be exposed to a hydrocracking catalyst under effective hydrocracking conditions. Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophophates. One example of suitable zeolite is USY, such as a USY zeolite with cell size of 24.30 Angstroms or less. Additionally or alternatively, the catalyst can be a low acidity molecular sieve, such as a USY zeolite with a Si to Al ratio of at least 20, and preferably at least 40 or 50. ZSM-48, such as ZSM-48 with a SiO$_2$ to Al$_2$O$_3$ ratio of 110 or less, such as 90 or less, is another example of a potentially suitable hydrocracking catalyst. Still another option is to use a combination of USY and ZSM-48. Still other options include using one or more of zeolite Beta, ZSM-5, ZSM-35, or ZSM-23, either alone or in combination with a USY catalyst. Non-limiting examples of metals for hydrocracking catalysts include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

When only one hydrogenation metal is present on a hydrocracking catalyst, the amount of that hydrogenation metal can be at least 0.1 wt % based on the total weight of the catalyst, for example at least 0.5 wt % or at least 0.6 wt %. Additionally or alternately when only one hydrogenation metal is present, the amount of that hydrogenation metal can be 5.0 wt % or less based on the total weight of the catalyst, for example 3.5 wt % or less, 2.5 wt % or less, 1.5 wt % or less, 1.0 wt % or less, 0.9 wt % or less, 0.75 wt % or less, or 0.6 wt % or less. Further additionally or alternately when more than one hydrogenation metal is present, the collective amount of hydrogenation metals can be at least 0.1 wt % based on the total weight of the catalyst, for example at least 0.25 wt %, at least 0.5 wt %, at least 0.6 wt %, at least 0.75 wt %, or at least 1 wt %. Still further additionally or alternately when more than one hydrogenation metal is present, the collective amount of hydrogenation metals can be 35 wt % or less based on the total weight of the catalyst, for example 30 wt % or less, 25 wt % or less, 20 wt % or less, 15 wt % or less, 10 wt % or less, or 5 wt % or less. In embodiments wherein the supported metal comprises a noble metal, the amount of noble metal(s) is typically less than 2 wt %, for example less than 1 wt %, 0.9 wt % or less, 0.75 wt % or less, or 0.6 wt % or less.

In various aspects, the conditions selected for hydrocracking for lubricant base stock production can depend on the desired level of conversion, the level of contaminants in the input feed to the hydrocracking stage, and potentially other factors. For example, hydrocracking conditions in a single stage, or in the first stage and/or the second stage of a multi-stage system, can be selected to achieve a desired level of conversion in the reaction system. Hydrocracking conditions can be referred to as sour conditions or sweet conditions, depending on the level of sulfur and/or nitrogen present within a feed. For example, a feed with 100 wppm or less of sulfur and 50 wppm or less of nitrogen, preferably less than 25 wppm sulfur and/or less than 10 wppm of nitrogen, represent a feed for hydrocracking under sweet conditions. In some aspects, such as aspects where an optional hydrotreating step is used prior to hydrocracking, the hydrotreated raffinate may correspond to a sweet feed. In other aspects, the raffinate may represent a feed for hydrocracking under sour conditions.

A hydrocracking process under sour conditions can be carried out at temperatures of 288° C. (550° F.) to 449° C. (840° F.), hydrogen partial pressures of from 1500 psig to 5000 psig (10.3 MPag to 34.6 MPag), liquid hourly space velocities of from 0.05 to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of 343° C. (600° F.) to 435° C. (815° F.), hydrogen partial pressures of from 1500 psig to 3000 psig (10.3 MPag-20.9 MPag), and hydrogen treat gas rates of from 213 $m^3/m^3$ to 1068 $m^3/m^3$ (1200 SCF/B to 6000 SCF/B). The LHSV can be from 0.25 $h^{-1}$ to 50 $h^{-1}$, or from 0.5 $h^{-1}$ to 20 $h^{-1}$, and preferably from 1.0 $h^{-1}$ to 4.0 $h^{-1}$.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as 177° C. (350° F.) or 204° C. (400° F.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least 177° C. (350° F.) or at least 204° C. (400° F.) to having an upper end cut point temperature of 370° C. (700° F.) or less or 343° C. (650° F.) or less. Optionally, the distillate fuel range can be extended to include additional kerosene, such as by selecting a lower end cut point temperature of at least 149° C. (300° F.).

In aspects where the inter-stage separator is also used to produce a distillate fuel fraction, the portion boiling below the distillate fuel fraction includes, naphtha boiling range molecules, light ends, and contaminants such as $H_2S$. These different products can be separated from each other in any convenient manner. Similarly, one or more distillate fuel fractions can be formed, if desired, from the distillate boiling range fraction. The portion boiling above the distillate fuel range represents the potential lubricant base stocks. In such aspects, the portion boiling above the distillate fuel range is subjected to further hydroprocessing in a second hydroprocessing stage for formation of one or more lubricant base stocks. Optionally, the lubricant base stock fractions can be distilled and operated in the catalyst dewaxing sections in a blocked operation where the conditions are adjusted to maximize the yield and properties of each base stock.

A hydrocracking process under sweet conditions can be performed under conditions similar to those used for a sour hydrocracking process, or the conditions can be different. In an embodiment, the conditions in a sweet hydrocracking stage can have less severe conditions than a hydrocracking process in a sour stage. Suitable hydrocracking conditions for a non-sour stage can include, but are not limited to, conditions similar to a first or sour stage. Suitable hydrocracking conditions can include temperatures of 288° C. (550° F.) to 449° C. (840° F.), hydrogen partial pressures of from 1500 psig to 5000 psig (10.3 MPag to 34.6 MPag), liquid hourly space velocities of from 0.05 to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of 343° C. (600° F.) to 435° C. (815° F.), hydrogen partial pressures of from 1500 psig to 3000 psig (10.3 MPag-20.9 MPag), and hydrogen treat gas rates of from 213 m$^3$/m$^3$ to 1068 m$^3$/m$^3$ (1200 SCF/B to 6000 SCF/B). The LHSV can be from 0.25 h$^{-1}$ to 50 h$^{-1}$, or from 0.5 h$^{-1}$ to 20 h$^{-1}$, and preferably from 1.0 h$^{-1}$ to 4.0 h$^{-1}$.

In still another aspect, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

In yet another aspect, a hydroprocessing reaction system may include more than one hydrocracking stage. If multiple hydrocracking stages are present, at least one hydrocracking stage can have effective hydrocracking conditions as described above, including a hydrogen partial pressure of at least 1500 psig (10.3 MPag). In such an aspect, other hydrocracking processes can be performed under conditions that may include lower hydrogen partial pressures. Suitable hydrocracking conditions for an additional hydrocracking stage can include, but are not limited to, temperatures of 288° C. (550° F.) to 449° C. (840° F.), hydrogen partial pressures of from 250 psig to 5000 psig (1.8 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions for an additional hydrocracking stage can include temperatures in the range of 343° C. (600° F.) to 435° C. (815° F.), hydrogen partial pressures of from 500 psig to 3000 psig (3.5 MPag-20.9 MPag), and hydrogen treat gas rates of from 213 m$^3$/m$^3$ to 1068 m$^3$/m$^3$ (1200 SCF/B to 6000 SCF/B). The LHSV can be from 0.25 h$^{-1}$ to 50 h$^{-1}$, or from 0.5 h$^{-1}$ to 20 h$^{-1}$, and preferably from 1.0 h$^{-1}$ to 4.0 h$^{-1}$.

Additional Hydroprocessing—Catalytic Dewaxing, Hydrofinishing, and Optional Hydrocracking The hydroprocessed raffinate can then be exposed to further hydroprocessing in the form of catalytic dewaxing and/or hydrofinishing to form Group I and/or Group II base stocks. In some optional aspects, a first lubricant boiling range portion of the hydroprocessed raffinate can be solvent dewaxed (as described above) while a second lubricant boiling range portion can be exposed to further hydroprocessing.

For catalytic dewaxing, suitable dewaxing catalysts can include molecular sieves such as crystalline aluminosilicates (zeolites). In an embodiment, the molecular sieve can comprise, consist essentially of, or be ZSM-22, ZSM-23, ZSM-48. Optionally but preferably, molecular sieves that are selective for dewaxing by isomerization as opposed to cracking can be used, such as ZSM-48, ZSM-23, or a combination thereof. Additionally or alternately, the molecular sieve can comprise, consist essentially of, or be a 10-member ring 1-D molecular sieve, such as EU-2, EU-11, ZBM-30, ZSM-48, or ZSM-23. ZSM-48 is most preferred. Note that a zeolite having the ZSM-23 structure with a silica to alumina ratio of from 20:1 to 40:1 can sometimes be referred to as SSZ-32. Optionally but preferably, the dewaxing catalyst can include a binder for the molecular sieve, such as alumina, titania, silica, silica-alumina, zirconia, or a combination thereof, for example alumina and/or titania or silica and/or zirconia and/or titania.

Preferably, the dewaxing catalysts used in processes according to the disclosure are catalysts with a low ratio of silica to alumina. For example, for ZSM-48, the ratio of silica to alumina in the zeolite can be 100:1 or less, or 90:1 or less, or 75:1 or less, or 70:1 or less. Additionally or alternately, the ratio of silica to alumina in the ZSM-48 can be at least 50:1, or at least 60:1, or at least 65:1.

In various embodiments, the catalysts according to the disclosure further include a metal hydrogenation component. The metal hydrogenation component is typically a Group VI and/or a Group VIII metal. Preferably, the metal hydrogenation component can be a combination of a non-noble Group VIII metal with a Group VI metal. Suitable combinations can include Ni, Co, or Fe with Mo or W, preferably Ni with Mo or W.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the catalyst can be at least 0.1 wt % based on catalyst, or at least 0.5 wt %, or at least 1.0 wt %, or at least 2.5 wt %, or at least 5.0 wt %, based on catalyst. The amount of metal in the catalyst can be 20 wt % or less based on catalyst, or 10 wt % or less, or 5 wt % or less, or 2.5 wt % or less, or 1 wt % or less. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

The dewaxing catalysts useful in processes according to the disclosure can also include a binder. In some embodiments, the dewaxing catalysts used in process according to the disclosure are formulated using a low surface area binder, a low surface area binder represents a binder with a surface area of 100 m$^2$/g or less, or 80 m$^2$/g or less, or 70 m$^2$/g or less. Additionally or alternately, the binder can have a surface area of at least 25 m$^2$/g. The amount of zeolite in a catalyst formulated using a binder can be from 30 wt % zeolite to 90 wt % zeolite relative to the combined weight of binder and zeolite. Preferably, the amount of zeolite is at least 50 wt % of the combined weight of zeolite and binder, such as at least 60 wt % or from 65 wt % to 80 wt %.

Without being bound by any particular theory, it is believed that use of a low surface area binder reduces the amount of binder surface area available for the hydrogenation metals supported on the catalyst. This leads to an increase in the amount of hydrogenation metals that are supported within the pores of the molecular sieve in the catalyst.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of framework alumina in the catalyst may range from 0.1 to 3.33 wt %, or 0.1 to 2.7 wt %, or 0.2 to 2 wt %, or 0.3 to 1 wt %.

Effective conditions for catalytic dewaxing of a feedstock in the presence of a dewaxing catalyst can include a temperature of from 300° C. to 450° C., preferably 343° C. to 435° C., a hydrogen partial pressure of from 3.5 MPag to 34.6 MPag (500 psig to 5000 psig), preferably 4.8 MPag to 20.8 MPag, and a hydrogen circulation rate of from 178 m$^3$/m$^3$ (1000 SCF/B) to 1781 m$^3$/m$^3$ (10,000 scf/B), preferably 213 m³/m³ (1200 SCF/B) to 1068 m³/m³ (6000 SCF/B). The LHSV can be from 0.2 h⁻¹ to 10 h⁻¹, such as from 0.5 h⁻¹ to 5 h⁻¹ and/or from 1 h⁻¹ to 4 h⁻¹.

Before and/or after catalytic dewaxing, the hydroprocessed raffinate can be exposed to an aromatic saturation catalyst, which can alternatively be referred to as a hydrofinishing catalyst. Exposure to the aromatic saturation can occur either before or after fractionation. If aromatic saturation occurs after fractionation, the aromatic saturation can be performed on one or more portions of the fractionated product. Alternatively, the entire effluent from the last hydrocracking or dewaxing process can be hydrofinished and/or undergo aromatic saturation.

Hydrofinishing and/or aromatic saturation catalysts can include catalysts containing Group VI metals, Group VIII metals, and mixtures thereof. In an embodiment, preferred metals include at least one metal sulfide having a strong hydrogenation function. In another embodiment, the hydrofinishing catalyst can include a Group VIII noble metal, such as Pt, Pd, or a combination thereof. The mixture of metals may also be present as bulk metal catalysts wherein the amount of metal is 30 wt. % or greater based on catalyst. Suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as 20 weight percent for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41.

Hydrofinishing conditions can include temperatures from 125° C. to 425° C., preferably 180° C. to 280° C., a hydrogen partial pressure from 500 psig (3.4 MPa) to 3000 psig (20.7 MPa), preferably 1500 psig (10.3 MPa) to 2500 psig (17.2 MPa), and liquid hourly space velocity from 0.1 hr⁻¹ to 5 hr⁻¹ LHSV, preferably 0.5 hr⁻¹ to 1.5 hr⁻¹. Additionally, a hydrogen treat gas rate of from 35.6 m³/m³ to 1781 m³/m³ (200 SCF/B to 10,000 SCF/B) can be used.

The catalytic dewaxing product can have a pour point of −6° C. or less, or −9° C. or less, or −15° C. or less, depending on the nature of the target lubricant base stock product. The resulting catalytic dewaxing product can be suitable for use in forming one or more types of Group II base stocks. Optionally, the resulting catalytic dewaxing product can have a viscosity index of at least 90, or at least 95, or at least 100.

Example of Reaction System Configuration

Figure 1:
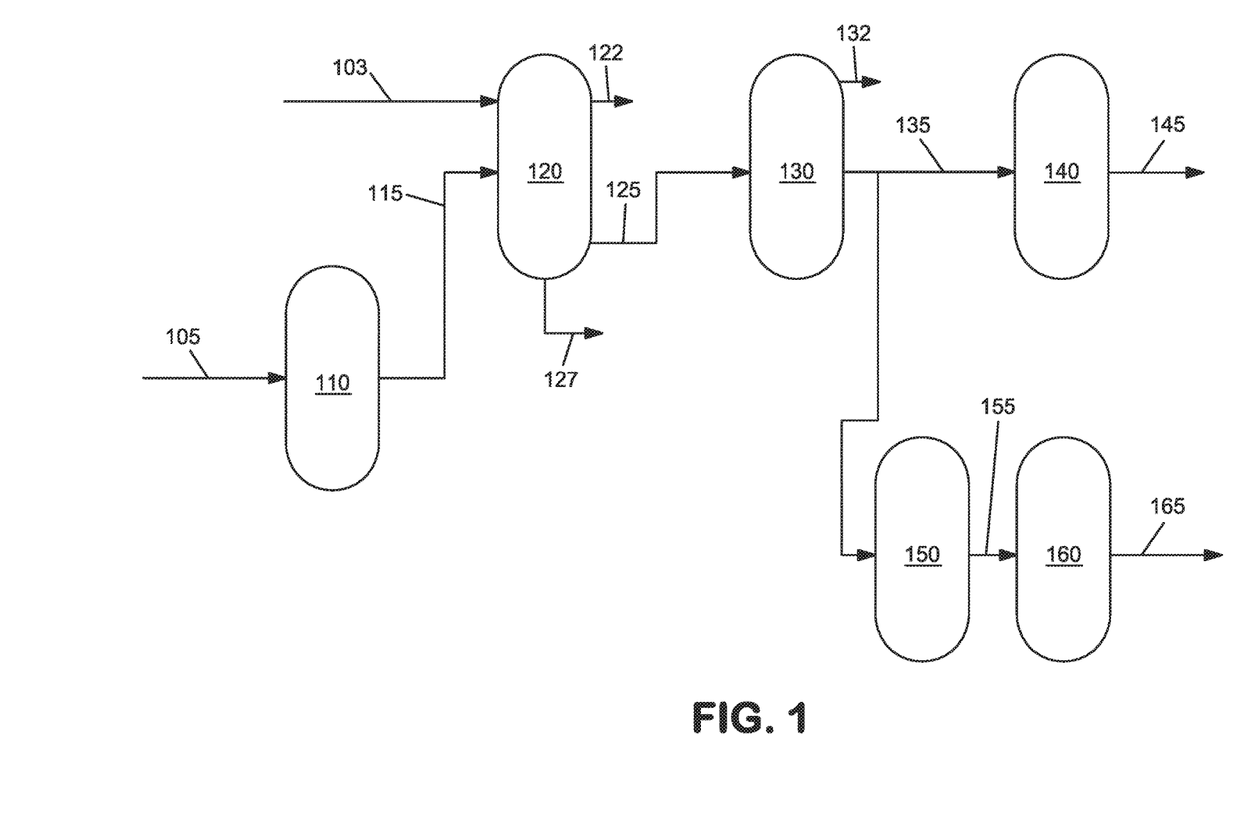
FIG. 1 shows an example of a reaction system for forming lubricant base stocks based on disadvantaged feeds.

FIG. 1 schematically shows an example of reaction system for forming both Group I base stocks via solvent dewaxing and Group II lubricant base stocks via catalytic dewaxing. In some aspects, either the solvent dewaxing or the catalytic dewaxing portion of the reaction system may be optional, so that a reaction system can focus on either Group I base stock or Group II base stock production.

In FIG. 1, a disadvantaged feed 105 is introduced into a hydroprocessing stage 110 to produce a hydroprocessed effluent 115. The hydroprocessed effluent 115 is then passed into one or more separators 120. An example of separator(s) 120 can be to use an atmospheric pipestill or distillation column followed by a vacuum pipestill or distillation column. Other types of separators can also be used, such as flash separators or other gas/liquid separators. The separators 120 can produce one or more lower boiling fractions 122, a lubricant boiling range fraction 125, and optionally a bottoms or resid fraction 127. The lower boiling fractions 122 can correspond to light ends, naphtha boiling range fractions, and/or diesel boiling range fractions. If the only feed introduced into separators 120 is the hydroprocessed effluent 115, the lubricant boiling range fraction 125 can optionally be the same as bottoms fraction 127. Optionally, another feed 103 for forming lubricant base stocks, such as a whole or partial crude oil, can be introduced into separators 120 for separation. The lubricant boiling range fraction 125 is then passed into solvent extractor 130 for formation of an aromatics extract fraction 132 and a raffinate fraction 135. The raffinate fraction 135 can then be processed in various ways, depending on the nature of the desired products. One option can be to solvent dewax 140 at least a portion of the raffinate fraction 135 to form solvent dewaxing product 145. Solvent dewaxing product 145 can correspond to a lubricant base stock, or solvent dewaxing product 145 can be fractionated to form one or more different lubricant base stocks. Another option can be to hydroprocess 150 at least a portion of raffinate fraction 135 to produce a hydroprocessed raffinate 155. The hydroprocessed raffinate 155 is then catalytically dewaxed 160 (optionally including hydrofinishing) to form a catalytic dewaxing product 165. Catalytic dewaxing product 145 can correspond to a lubricant base stock, or catalytic dewaxing product 145 can be fractionated to form one or more different lubricant base stocks.

Figure 2:
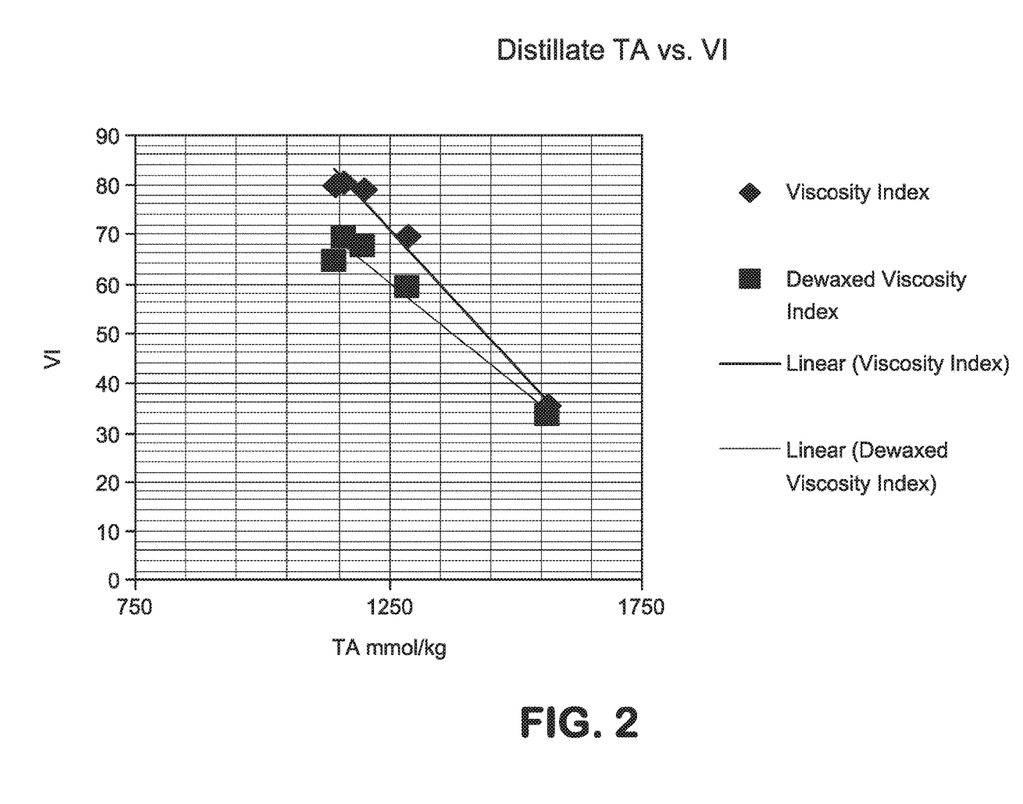
FIG. 2 shows viscosity index and dewaxed viscosity versus total aromatics content for various feeds.

Example 1—Lubricant Base Stock from Hydroprocessed Bottoms of Disadvantaged Feed FIG. 2 shows an example of a correlation between the total aromatics content of a distillate (lubricant boiling range) fraction and the corresponding viscosity index (VI) of the fraction, as well as the dewaxed distillate viscosity index (DDVI). As shown in FIG. 2, aromatics contents of greater than ~50 wt % can substantially depress the resulting VI and/or DDVI of a fraction. This type of high aromatics content represents one type of feature that can correspond to a disadvantaged feed, as the lubricant boiling range portions of conventional lubricant feeds can typically have lower aromatics contents.

Figure 3:
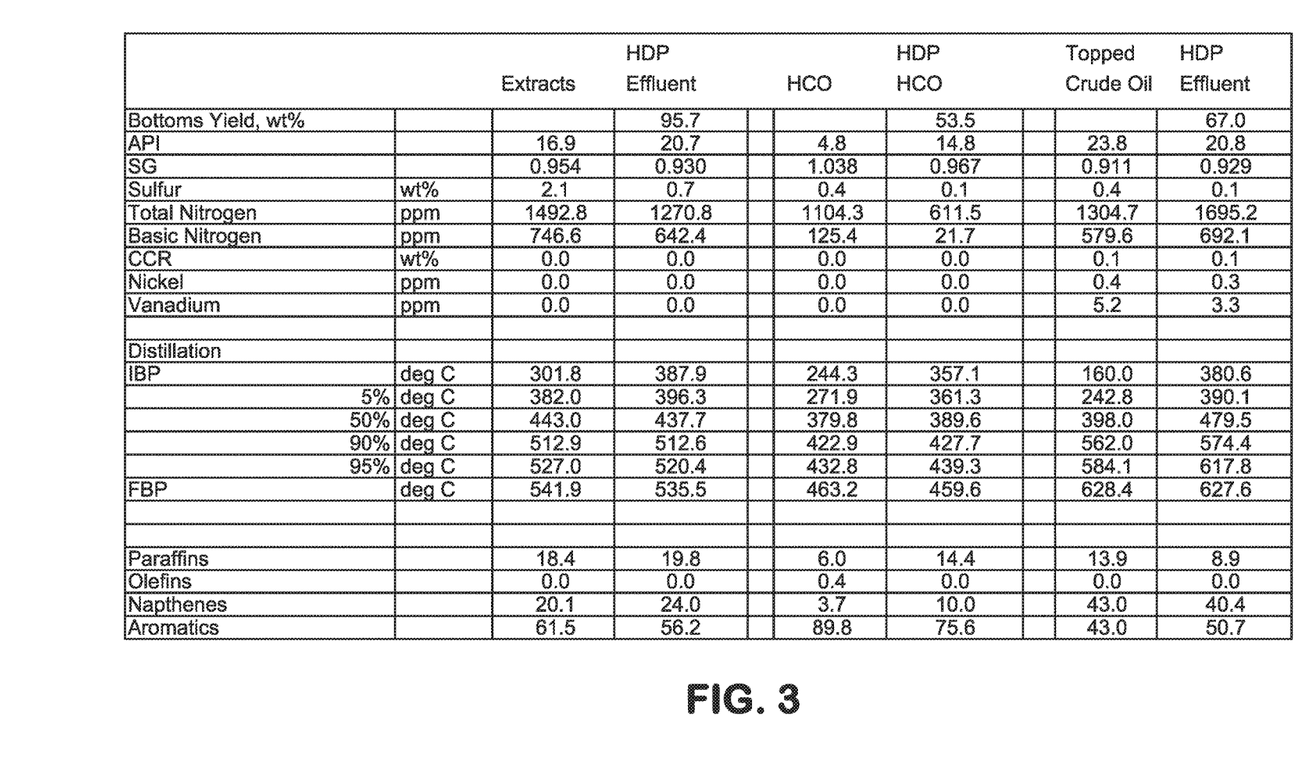
FIG. 3 shows examples of disadvantaged feeds and corresponding hydroprocessed bottoms fractions.

FIG. 3 shows examples of three types of disadvantaged feeds. For each disadvantaged feed, a corresponding hydroprocessed bottoms fraction that can be derived from the disadvantaged feed is also shown.

The first feed in FIG. 3 corresponds to an aromatics extract product from a solvent extraction process. Although this feed has a suitable boiling range for lubricant base stock production, it is a disadvantaged feed (relative to conventional feeds for lubricant base stock production) due to a high aromatics content, a somewhat low API gravity, and a somewhat high basic nitrogen content. The second feed in FIG. 3 corresponds to a heavy cycle oil (HCO) from a fluid catalytic cracking process. This feed is disadvantaged due to a high aromatics content, a low paraffin content, and a low API gravity. The third feed in FIG. 3 corresponds to a topped crude oil. The topped crude oil still contains a substantial portion of compounds with boiling points below 370° C. These lighter fractions can cause some properties, such as paraffin content, aromatics content, and basic nitrogen, to be more favorable for the topped crude than for just the lubricant boiling range portion. This feed is disadvantaged due to the low paraffin content and high aromatics content.

Each of the feeds in FIG. 3 was hydrotreated at ~332° C. at a pressure of 1450 psig (10 MPag). The reported values were determined by corresponding ASTM methods (if available). As shown in FIG. 3, the hydrotreatment of the disadvantaged feeds can sufficiently improve the properties of the feeds to allow for further processing for lubricant base stock formation.

A vacuum gas oil derived from a feed similar to the topped crude shown in FIG. 3 was used as a feed for modeling a process for forming Group I base stocks as described herein. The model used was an empirical model based on compositional analysis of prior similar feeds and products. The modeled process included hydroprocessing to form a hydroprocessed bottoms fraction. The bottoms fraction was then solvent extracted and solvent dewaxed in various runs to form solvent dewaxing products. The model processing conditions were used to model formation of a lighter Group I base stock product (150N) and a heavier Group I base stock product (600N).

For both the 150N and 600N products, the model included extracting the hydrotreated bottoms with NMP at a solvent dosage of 170 vol % to 200 vol % of the feed. The raffinate yield was ~60 wt % for both products. The model then included solvent dewaxing the raffinates to a target pour point of −9° C. This produced about an 80 vol % yield for each product, with a slightly higher yield for the 150N product. The properties of the raffinate and the solvent dewaxed product are shown in Table 1.

TABLE 1

Modeled production of lubricant base stocks from solvent processing

|  | 150N Distillate | 150N Dewaxed Oil | 600N Distillate | 600N Dewaxed Oil |
|---|---|---|---|---|
| KV@40° C. (cSt) | 35.9 | 31.4 | 207.9 | 110.9 |
| KV@100° C. (cSt) | 5.5 | 5.3 | 14.8 | 11.9 |
| Viscosity Index | 80.6 | 100.0 | 56.9 | 95.4 |
| Dewaxed Viscosity Index | 64.5 | 99.9 | 55.3 | 95.4 |
| Total S (wt %) | 0.10 | 0.06 | 0.16 | 0.12 |
| Basic N (wppm) | 88 | 14 | 187 | 468 |
| Total aromatics (wt %) | ~46 | ~18 | ~39 | ~19 |
| 2+ ring aromatics (wt %) | ~25 | ~2 | ~25 | ~5 |
| 3+ ring aromatics (wt %) | ~12 | ~0 | ~15 | ~2 |
| Dewaxed KV@40° C. (cSt) | 46.0 |  | 266.0 |  |
| Dewaxed KV@100° C. (cSt) | 6.1 |  | 17.1 |  |

The results shown in Table 1 demonstrate the ability to produce Group I base stocks from solvent dewaxing of the hydroprocessing bottoms of a disadvantaged feed.

Example 2—Lubricant Base Stock from Mixed Traditional and Disadvantaged Feed Group I base stocks were produced from a feed corresponding to a conventional lubricant boiling range feed that also included 3 wt % of hydroprocessed bottoms from a disadvantaged feed in two different types of processing runs. In one type of processing run (Run 1), the disadvantaged feed for hydroprocessing included ~30 wt % of an aromatics extract fraction from a solvent extraction process and ~3 wt % of a vacuum resid fraction. In a second type of processing run (Run 2), the disadvantaged feed included ~30 wt % of an aromatics extract fraction, ~25 wt % of low paraffin content and/or high aromatics content vacuum gas oils, and ~6 wt % of a heavy cycle oil.

In the processing runs, the feeds were processed at temperatures of about 390° C. to about 400° C. at a reaction pressure of about 10 MPag and a hydrogen purity of 93-94%. Table 2 shows an example of a hydroprocessed bottoms product from both the first and second types of processing runs.

TABLE 2

Hydroprocessed bottoms properties

|  | Run 1 | Run 2 |
|---|---|---|
| Total aromatics (wt %) | ~55 | ~39 |
| Mono aromatics (wt %) | ~26 | ~21 |
| 2+ ring aromatics (wt %) | ~19 | ~18 |
| 3+ ring aromatics (wt %) | ~6 | ~4 |
| Sulfur (wt %) | 0.19 | 0.20 |
| Nitrogen (wppm) | 38 | <117 |

The hydroprocessed bottoms shown in Table 2 were then blended with a conventional lubricant base stock feed (3 wt % of the hydroprocessed bottoms) and solvent processed to form 150N and 600N base stocks. Table 3 shows the atmospheric resid yield from distillation of the combined conventional feed and 3 wt % hydroprocessed bottoms, as well the resulting yields and properties for 150N and 600N base stocks formed from each type of processing run.

TABLE 3

150N and 600N base stock properties from combined lubricant feed

| (All yields relative to crude) | Run 1 | Run 2 |
|---|---|---|
| Atmospheric Resid yield (%) | 36.8 | 41.8 |
| 150N distillate |  |  |
| Yield (vol %) | 8.3 | 10.5 |
| KV@100° C. (cSt) | 5.2 | 5.4 |
| Noack (wt %) | 15.6 | 14.8 |
| MABP (° C.) | 423 | 423 |
| 5% off (° C.) | 371 | 374 |
| 95% off (° C.) | 473 | 470 |
| FBP (° C.) | 503 | 496 |
| 600N distillate |  |  |
| Yield (vol %) | 7.8 | 10.7 |
| KV@100° C. (cSt) | 15.4 | 14.7 |
| MABP (° C.) |  | 494 |
| 5% off (° C.) |  | 425 |
| 95% off (° C.) |  | 565 |

Figure 4:
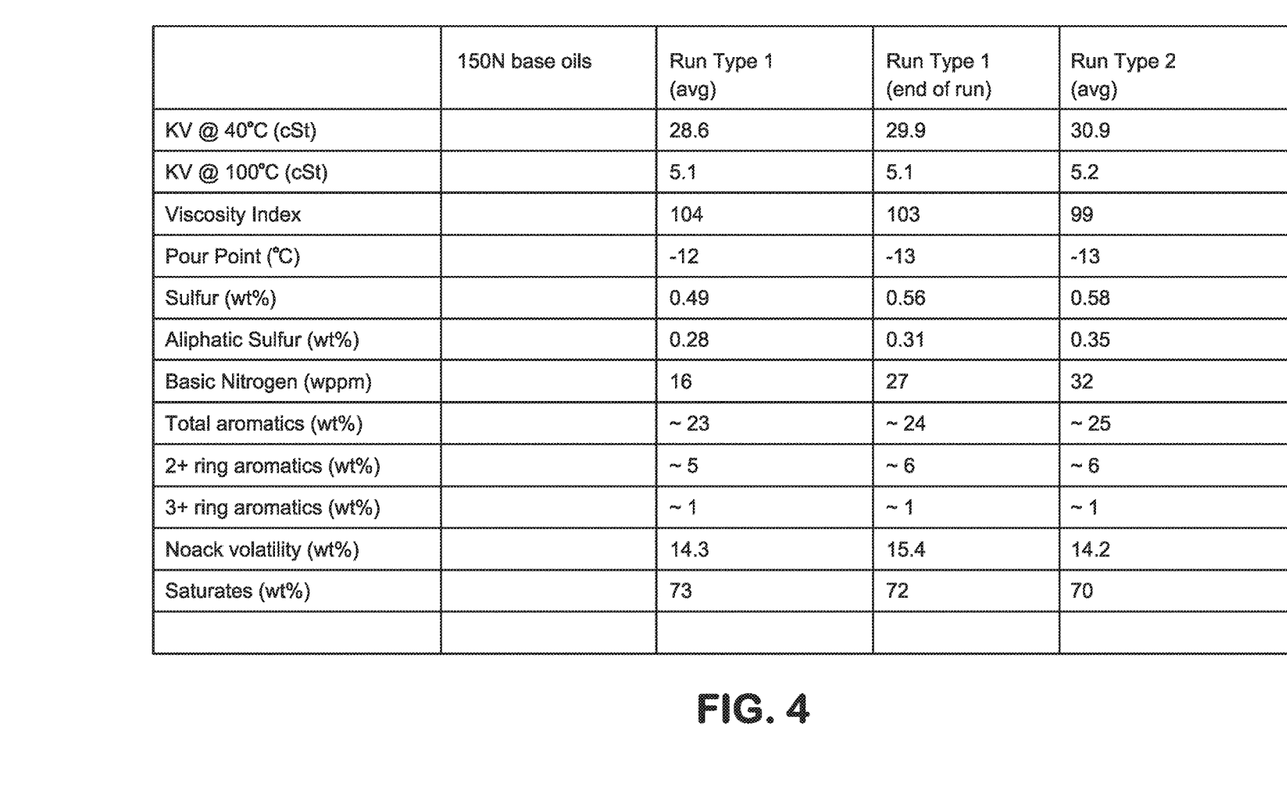
FIG. 4 shows examples of light neutral base stocks formed by processing of mixtures of disadvantaged feeds and conventional feeds.
Figure 5:
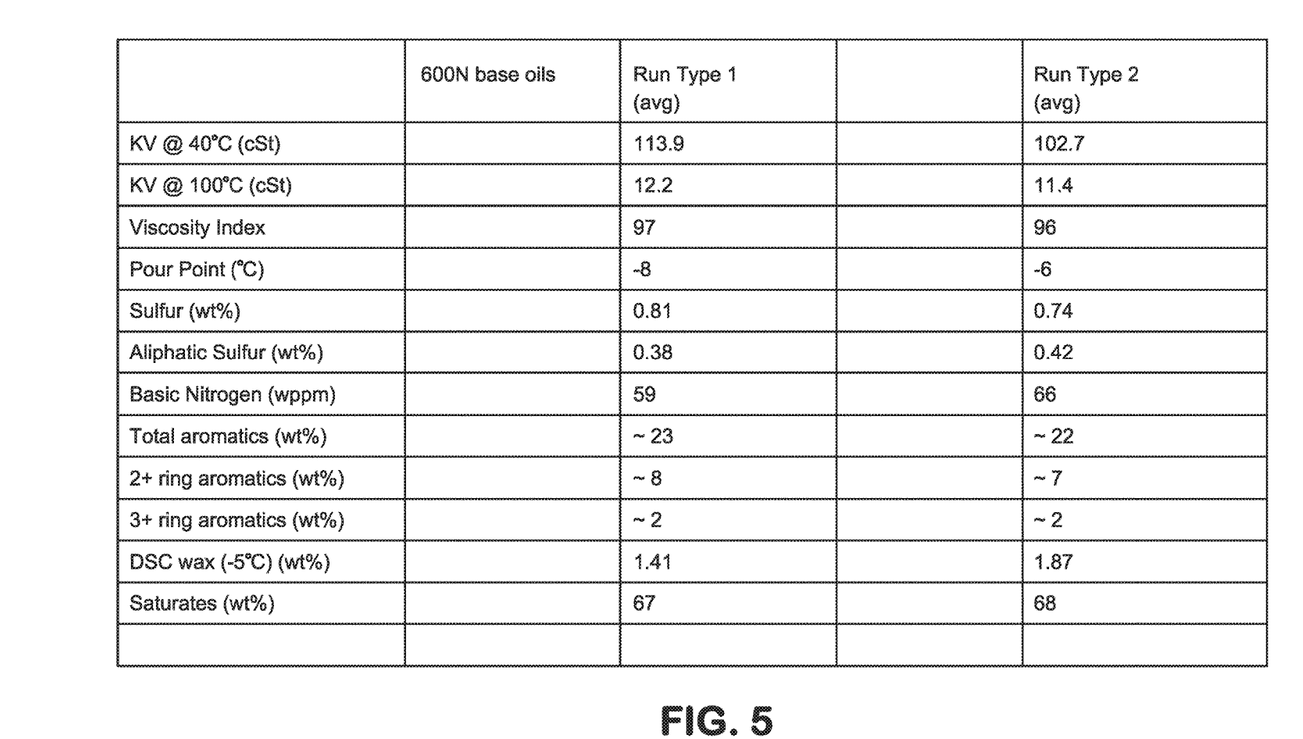
FIG. 5 shows examples of heavy neutral base stocks formed by processing of mixtures of disadvantaged feeds and conventional feeds.

Additional properties for the resulting 150N base stocks from each type of processing run are shown in FIG. 4. Additional properties for the resulting 600N base stocks are shown in FIG. 5. The properties in FIGS. 4 and 5 demonstrate the ability to incorporate hydroprocessed bottoms from disadvantaged feeds into lubricant base stock products.

ADDITIONAL EMBODIMENTS

Embodiment 1

A method for forming a lubricant base stock, comprising: hydroprocessing a feed having at least one of a) a total aromatics content of at least 60 wt % and b) a paraffin content of 10 wt % or less under first effective hydroprocessing conditions to form a hydroprocessed effluent comprising at least 50 wt % of hydroprocessed bottoms, the hydroprocessed bottoms having a paraffin content of at least 10 wt % (or at least 15 wt %) and a total aromatics content of 60 wt % or less (or 50 wt % or less); performing a solvent extraction on at least a portion of the hydroprocessed bottoms to form an extract fraction and a raffinate fraction; hydroprocessing at least a portion of the raffinate fraction under second effective hydroprocessing conditions to form a hydroprocessed raffinate; and catalytically dewaxing at least a portion of the hydroprocessed raffinate to form a catalytic dewaxing effluent, the catalytic dewaxing effluent having a VI of at least 80, an aromatics content of 10 wt % or less, and a sulfur content of 300 wppm or less.

Embodiment 2

A lubricant base stock composition having a viscosity index of at least 80, an aromatics content of 10 wt % or less, and a sulfur content of 300 wppm or less, the lubricant base stock composition being formed by the method comprising: hydroprocessing a feed having at least one of a) a total aromatics content of at least 60 wt % and b) a paraffin content of 10 wt % or less under first effective hydroprocessing conditions to form a hydroprocessed effluent comprising at least 50 wt % of hydroprocessed bottoms, the hydroprocessed bottoms having a paraffin content of at least 10 wt % (or at least 15 wt %) and a total aromatics content of 60 wt % or less (or 50 wt % or less); performing a solvent extraction on at least a lubricant boiling range portion of the hydroprocessed bottoms to form an extract fraction and a raffinate fraction; hydroprocessing at least a portion of the raffinate fraction under second effective hydroprocessing conditions to form a hydroprocessed raffinate; and catalytically dewaxing at least a portion of the hydroprocessed raffinate to form the lubricant base stock composition.

Embodiment 3

The method or lubricant base stock composition of any of the above embodiments, further comprising hydrofinishing at least a portion of the catalytic dewaxing effluent, the at least a portion of the hydroprocessed raffinate, or a combination thereof.

Embodiment 4

The method or lubricant base stock composition of any of the above embodiments, further comprising separating the hydroprocessed bottoms to form at least a lubricant boiling range fraction, the at least a portion of the hydroprocessed bottoms comprising the lubricant boiling range fraction.

Embodiment 5

The method or lubricant base stock composition of Embodiment 4, wherein separating the hydroprocessed bottoms further comprises separating a second feedstock comprising a second lubricant boiling range fraction, and wherein performing a solvent extraction on at least a portion of the hydroprocessed bottoms further comprises performing a solvent extraction on the second lubricant boiling range fraction.

Embodiment 6

The method or lubricant base stock composition of any of the above embodiments, wherein the feed comprises a total aromatics content of at least 60 wt % and a paraffin content of 10 wt % or less.

Embodiment 7

The method or lubricant base stock composition of any of the above embodiments, wherein the feed comprises a heavy cycle oil, an aromatics extract fraction derived from a solvent extraction process, or a combination thereof.

Embodiment 8

The method or lubricant base stock composition of any of the above embodiments, wherein the hydroprocessed bottoms comprise a 2-ring aromatics content of at least 15 wt % and/or 40 wt % or less, a 3-ring aromatics content of at least 5 wt % and/or 20 wt % or less, or a combination thereof.

Embodiment 9

The method or lubricant base stock composition of any of the above embodiments, wherein the feed comprises a sulfur content of at least 3000 wppm, a basic nitrogen content of at least 500 wppm, or a combination thereof.

Embodiment 10

The method or lubricant base stock composition of any of the above embodiments, wherein the hydroprocessed bottoms comprise a sulfur content of 3000 wppm or less, a basic nitrogen content of 500 wppm or less, or a combination thereof.

Embodiment 11

The method or lubricant base stock composition of any of the above embodiments, wherein the hydroprocessed bottoms have a viscosity index of at least 50 (or at least 60 or at least 70), wherein the hydroprocessed bottoms have a solvent dewaxed viscosity index at a pour point of −9° C. of at least 40 (or at least 50 or at least 60), or a combination thereof.

Embodiment 12

The method or lubricant base stock composition of any of the above embodiments, wherein the first effective hydroprocessing conditions comprise hydrotreating conditions, hydrocracking conditions, or a combination thereof.

Embodiment 13

The method or lubricant base stock composition of any of the above embodiments, wherein the second effective hydroprocessing conditions comprise hydrotreating conditions, hydrocracking conditions, or a combination thereof, the second effective hydroprocessing conditions optionally comprising conditions effective for conversion of 10 wt % to 70 wt % of the at least a portion of the raffinate fraction relative to a conversion temperature of 370° C.

Embodiment 14

The method or lubricant base stock composition of Embodiment 13, wherein the second effective hydroprocessing conditions comprise hydrocracking the at least a portion of the raffinate fraction to form an intermediate effluent; separating the intermediate effluent to form i) at least one of a naphtha boiling range fraction and a distillate boiling range fraction, and ii) a higher boiling range fraction; and hydrocracking the higher boiling range fraction to form the hydroprocessed raffinate.

Embodiment 15

The method of claim 1, further comprising processing at least a portion of the hydroprocessed effluent under fluid catalytic cracking conditions.

Embodiment 16

A lubricant base stock product formed according to the method of any of claim 1 or 3-15.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for forming a lubricant base stock, comprising:
   hydroprocessing a feed having at least one of a) a total aromatics content of at least 60 wt % and b) a paraffin content of 10 wt % or less under first effective hydroprocessing conditions to form a hydroprocessed effluent comprising at least 50 wt % of hydroprocessed bottoms, the hydroprocessed bottoms having a paraffin content of at least 10 wt % and a total aromatics content of 60 wt % or less;
   performing a solvent extraction on at least a portion of the hydroprocessed bottoms to form an extract fraction and a raffinate fraction;
   hydroprocessing at least a portion of the raffinate fraction under second effective hydroprocessing conditions to form a hydroprocessed raffinate; and
   catalytically dewaxing at least a portion of the hydroprocessed raffinate to form a catalytic dewaxing effluent, the catalytic dewaxing effluent having a VI of at least 80, an aromatics content of 10 wt % or less, and a sulfur content of 300 wppm or less.

2. The method of claim 1, further comprising hydrofinishing at least a portion of the catalytic dewaxing effluent, the at least a portion of the hydroprocessed raffinate, or a combination thereof.

3. The method of claim 1, further comprising separating the hydroprocessed bottoms to form at least a lubricant boiling range fraction, the at least a portion of the hydroprocessed bottoms comprising the lubricant boiling range fraction.

4. The method of claim 3, wherein separating the hydroprocessed bottoms further comprises separating a second feedstock comprising a second lubricant boiling range fraction, and wherein performing a solvent extraction on at least a portion of the hydroprocessed bottoms further comprises performing a solvent extraction on the second lubricant boiling range fraction.

5. The method of claim 1, wherein the feed comprises a total aromatics content of at least 70 wt % and a paraffin content of 10 wt % or less.

6. The method of claim 1, wherein the feed comprises a heavy cycle oil, an aromatics extract fraction derived from a solvent extraction process, or a combination thereof.

7. The method of claim 1, wherein the hydroprocessed bottoms comprise a 2-ring aromatics content of 40 wt % or less, a 3-ring aromatics content of 20 wt % or less, or a combination thereof.

8. The method of claim 1, wherein the feed comprises a sulfur content of at least 3000 wppm, a basic nitrogen content of at least 500 wppm, or a combination thereof.

9. The method of claim 1, wherein the hydroprocessed bottoms comprise a sulfur content of 3000 wppm or less, a basic nitrogen content of 500 wppm or less, or a combination thereof.

10. The method of claim 1, wherein the hydroprocessed bottoms comprise a viscosity index of at least 50.

11. The method of claim 1, wherein the hydroprocessed bottoms have a solvent dewaxed viscosity index at a pour point of −9° C. of at least 40.

12. The method of claim 1, wherein the first effective hydroprocessing conditions comprise hydrotreating conditions, hydrocracking conditions, or a combination thereof.

13. The method of claim 1, wherein the second effective hydroprocessing conditions comprise hydrotreating conditions, hydrocracking conditions, or a combination thereof.

14. The method of claim 13, wherein the second effective hydroprocessing conditions comprise conditions effective for conversion of 10 wt % to 70 wt % of the at least a portion of the raffinate fraction relative to a conversion temperature of 370° C.

15. The method of claim 13, wherein the second effective hydroprocessing conditions comprise hydrocracking the at least a portion of the raffinate fraction to form an intermediate effluent; separating the intermediate effluent to form i) at least one of a naphtha boiling range fraction and a distillate boiling range fraction, and ii) a higher boiling range fraction; and hydrocracking the higher boiling range fraction to form the hydroprocessed raffinate.

16. The method of claim 1, further comprising processing at least a portion of the hydroprocessed effluent under fluid catalytic cracking conditions.

* * * * *